(12) United States Patent
Lonc et al.

(10) Patent No.: US 6,455,153 B1
(45) Date of Patent: Sep. 24, 2002

(54) RELEASE COATING FOR TAPES

(75) Inventors: Gregory J. Lonc; Jan J. Spitzer, both of Charlotte, NC (US)

(73) Assignee: BASF AG, Ludwigshafen (DE)

( * ) Notice: Subject to any disclaimer, the term of this patent is extended or adjusted under 35 U.S.C. 154(b) by 0 days.

(21) Appl. No.: 09/477,708

(22) Filed: Jan. 5, 2000

(51) Int. Cl.$^7$ .................................................. B32B 7/12

(52) U.S. Cl. ...................... 428/352; 428/41.8; 428/41.3; 428/41.5; 526/338

(58) Field of Search ................................. 526/335, 338, 526/340, 342, 318.5, 318.6; 428/41.3, 41.5, 41.8, 352

(56) References Cited

U.S. PATENT DOCUMENTS

| | | | | |
|---|---|---|---|---|
| 4,241,143 A | * | 12/1980 | Ashie et al. | 428/512 |
| 4,657,966 A | * | 4/1987 | Mallya | 524/747 |
| 5,618,577 A | * | 4/1997 | Pearson et al. | 427/135 |
| 5,705,551 A | * | 1/1998 | Sasaki et al. | 524/366 |
| 6,042,918 A | * | 3/2000 | Appelt et al. | 428/64 |

* cited by examiner

*Primary Examiner*—James J. Seidleck
*Assistant Examiner*—Melanie Bissett

(57) ABSTRACT

The present invention is directed to a release coating composition comprising a polymer of butadiene, styrene, acrylonitrile polymer having a $T_g$ from 0° C. to about 75° C. The present invention is also directed to an article of manufacture having a release coating comprising the polymer for pressure sensitive adhesives.

10 Claims, No Drawings

RELEASE COATING FOR TAPES

FIELD OF THE INVENTION

The present invention relates to release coatings, and in particular to release coatings which can be used in conjunction with pressure-sensitive adhesives.

BACKGROUND OF THE INVENTION

Pressure sensitive adhesives (PSAs) have widespread uses a bonding agents for manufacturing tapes, labels, decals, and the like. PSAs adhere to many surfaces with no more than applied finger pressure, e.g., various tapes (office, packaging, masking, etc.) or labels (office, shipping, identification, etc.). The adhesive is typically coated onto a "backing," which includes any suitable substrate, such as films, foil, and paper. The adhesive may be coated onto one or both sides of the backing. The side of the backing coated with adhesive is referred to as the "adhesive-coated backing side."

In the case of tapes, the adhesive-coated backing is typically wound onto itself to form a roll, wherein the adhesive-coated backing side is in direct contact with the adhesive-free backing side of the continuous backing in the roll. As a result, tapes typically have two sides or surfaces: one side that is coated with a PSA, and the other side of the tape, which is free of adhesive. It is, therefore advantageous for the adhesive layer to have a different affinity for one side of the tape than that of the opposite side (e.g., for the two sides) of the tape. Such differential affinity is typically achieved by two methods: the primer coating method and the release coating method. In the primer coating method, an adhesive that has a low affinity for the backing is selected, and a primer coat is used to make the adhesive layer bond strongly to the backing. Upon rolling, the adhesive-coated backing side adheres therefore less strongly to the adhesive-free backing side. Non-limiting examples of this method include solvent-based natural rubber adhesives coated onto unplasticized polyvinylchloride film and aqueous-based acrylic adhesives coated onto oriented polypropylene film, wherein the coated backing side has been "primed" by corona discharge treatment.

In the release coating method, a release coating is applied to the adhesive-free side of the tape and an adhesive is applied to the other side of the tape to form the adhesive-coated backing side. The release coating has a strong affinity for the backing but a weak affinity for the adhesive. The adhesive-free side of the backing, which is coated with a releasing agent, is referred to herein as the "release-coated backing side." In certain cases, both sides of the backing may be coated with adhesive and a separate backing containing the release-coating (release-coated paper) may be applied to one or both sides of the adhesive-coated backing sides. A backing having both sides coated with adhesive is referred to herein as "double adhesive-coated backing", and the side or sides which contain the release-coated paper is referred to herein as the "release-coated paper side." Such release coatings make it possible for the tape to be unwound from the roll (i) without using excessive force (low release peel force) and (ii) without causing the adhesive to adhere to the release-coated backing side.

Release coatings should also have the following characteristics. The low affinity of the release coating toward the adhesive should be maintained over prolonged exposure to wide variations of temperature and humidity. The release coating should also strongly bond to the backing side so that it does not delaminate when aggressive adhesives are used. Lastly, it is desired that components of the release coating do not migrate into the adhesive, thereby deteriorating the properties of the adhesive.

Conventional release coatings have been based on various polymers and copolymers prepared from monomers, such as alkylacrylates and alkylmethacrylates, vinylacetate, vinylchloride and acrylonitrile and combinations thereof. These monomers, however, are relatively expensive, and some of these monomers also require special and more expensive handling because of their toxicity. In addition, such conventional coatings often fail when the rolled tape is aged under heat and humidity.

It is, therefore, an object of the present invention to provide release coating compositions that provide release coatings with acceptable peel force values after prolonged exposure to heat and humidity. It is another object of the present invention to provide release coating compositions that include relatively inexpensive polymer components. These and other objects of this invention will become apparent in light of the following disclosure.

SUMMARY OF THE INVENTION

The present invention is directed to a release coating composition that includes (a) from about 20% to about 55% by weight of a copolymer having a $T_g$ from 0° C. to about 75° C., and (b) from about 45% to about 80% by weight of solvent. The copolymer has from 0% to about 50% by weight of acrylonitrile monomer, and from about 50% to about 100% by weight of butadiene and styrene monomers. The copolymer can further include one or more stability enhancing monomers. In one embodiment, the release coating composition can further include a release promoting additive. The present invention is also directed to release coatings obtained from applying and drying the release coating composition.

In another embodiment, the present invention is directed to a release coating that includes (a) from about 80% to 100% by weight of a copolymer having a $T_g$ from 0° C. to about 75° C., and (b) from 0% to about 20% by weight of a release promoting additive. The copolymer has from about 0% to about 50% by weight of acrylonitrile monomer, and from about 50% to about 100% by weight of butadiene and styrene monomers.

In still another embodiment, the present invention is directed to an article of manufacture, which includes (a) a backing having an adhesive-coated backing side, and (b) a release coating applied to the other side of the backing of (a) or a separate backing. The release coating is situated so that it is in contact with the adhesive-coated backing side. The release coating has from about 80% to about 100% by weight of a copolymer having a $T_g$ from 0° C. to about 75° C., wherein the copolymer comprising from 0% to about 50% by weight of acrylonitrile monomer, and from about 50% to about 100% by weight of butadiene and styrene monomers. The release coating of this article of manufacture can further include a release promoting additive.

DETAILED DESCRIPTION OF THE INVENTION

It has been surprisingly found that release coatings prepared from polymers of butadiene, styrene and acrylonitrile (BSA polymer) provide excellent, low release force even after prolonged exposure to heat and humidity. Until now it has been believed by those skilled in the adhesive/coatings arts that polymers of styrene and butadiene could not be successfully modified to form effective release coatings.

This belief results from the well accepted chemical phenomenon that like materials tend to have a high affinity towards like materials. Since pressure-sensitive adhesives are typically produced from hydrocarbon based polymers of styrene and butadiene, e.g., triblock styrene-butadiene-styrene polymers, it was believed that effective release coatings could not contain styrene and butadiene monomers.

In line with this belief, conventional release coatings have contained various polymers, prepared from monomers which chemically differ from styrene and butadiene, such as alkylacrylates and alkylmethacrylates, vinylacetate, vinylchloride, acrylonitrile, and combinations thereof. Although effective, these conventional polymers used in release coatings are relatively expensive in comparison to the BSA polymers used in the present invention, and some also require special and more expensive handling because of their toxicity.

A. Release Coating Compositions

The release coating compositions of the present invention include: (i) a polymer of butadiene, styrene, and acrylonitrile, and (ii) a solvent. Preferably, the release coating compositions of the present invention further include one or more release promoting additives.

The release coating compositions of the present invention include from about 20% to about 55%, preferably from about 30% to about 40% by weight of a polymer of butadiene, styrene and acrylonitrile ("BSA polymer"), from about 45% to about 80%, preferably from about 60% to about 70% by weight of a solvent. The term "about," as used herein, means plus or minus 10% of the stated value. The terms "BSA polymer" and "copolymer," as used herein, mean a polymer having two (styrene and butadiene), or more different monomers.

The solvent can be any suitable fluid that can be evaporated at room temperature or upon applying heat. Preferred solvents those known in the art for use in emulsion polymerization, mass polymerization, and mass-suspension polymerization. More preferred are solvents used in emulsion polymerization. Nonlimiting examples of preferred solvents include water, methanol, isopropanol, and mixtures thereof.

These BSA polymers have a $T_g$ from 0° C. to about 75° C., preferably from about 20° C. to about 60° C. The term "$T_g$," as used herein, means the glass-transition temperature of the polymer as determined by the Fox equation, which is described in Sperling, *Polymeric Multicomponent Materials*, Chapter 1, pp. 24–29 (1997). The BSA polymers according to the present invention have from about 0% to about 50%, preferably from about 5% to about 50% by weight of acrylonitrile monomer, and from about 50% to about 100%, preferably from about 50% to about 95% by weight of butadiene and styrene monomers. More preferably, the BSA polymers have from about 15% to about 40% by weight of acrylonitrile monomer and from about 60% to about 85% by weight of butadiene and styrene monomers. Typically, the BSA polymers contain (i) from about 10% to about 35%, preferably from about 15% to about 25% by weight of butadiene monomer, and (ii) from about 25% to about 75%, preferably from about 45% to about 55% by weight of styrene monomer.

The BSA polymers according to the present invention can be manufactured according to any polymerization process known in the art. Such polymerization processes include, but are not limited to, emulsion polymerization, mass polymerization, and mass-suspension polymerization, as described in Kirk-Othmer, *Encyclopedia of Chemical Technology*, 4$^{th}$ Ed. Vol. 1, pp. 396–398. Preferably, the BSA polymers are manufactured by emulsion polymerization process.

In one embodiment, the BSA polymers of the present invention further include from about 0.50% to about 15%, preferably from about 1.0% to about 10% of at least one stability enhancing monomers. The term "stability enhancing monomers," as used herein, means a monomer that provides colloidal stability for the polymer during emulsion polymerization and/or improves polymer properties, such as tensile strength. Examples of stability enhancing monomers include, but are not limited to, acrylic acid; itaconic acid; acrylamide, such as N-methylolacrylamide; fumaric acid; methacrylic acid; maleic acid; and the like. Most preferably, the BSA polymers of the present invention include from about 0.5% to about 3.0% by weight of acrylic acid monomer, from 0% to about 1.5% by weight of itaconic acid monomer, and from 0.5% to about 3.0% by weight of acrylamide monomer.

In another embodiment, the release coating compositions of the present invention further include from about 1% to about 15% by weight of a release promoting additive, which is post-added. Post-added means that the additive is added after polymerization of the polymer is completed. Without wanting to be limited by any one theory, it is believed that these release promoting additives help to maintain or enhance the release properties of the release coating. Examples of release promoting additives useful herein include, but are not limited to, anionic surface active agents, cationic surface active agents, zwitter-ionic surface active agents, non-ionic surface active agents, and mixtures thereof. Typically, these surface active agents contain C8–C22 alkyl chains, C8–C22 alkyl substituted aryls, silicon atoms, fluorine atoms, and combinations thereof, as described in "Handbook of Pressure-Sensitive Adhesive Technology," ed. D. Satas, Satas & Associates, Warwick, R.I., 1999, Chap. 26, pps. 637–646. Non-limiting examples of useful release promoting additives include N-alkyl sulfosuccinamates, dialkyl sulfosuccinates, alkyl sulfates and sulfonates, alkyl-polyalkyleneoxidesulfates, alkyl-aryl-polyalkyleneoxidesulfates, alkyl-aryl-sulfonates, alkylpolyalkyleneoxides, alkyl-aryl-polyalkyleneoxides, block copolymers of alkyloxides, and mixtures thereof.

Specific examples of release promoting additives useful herein include, but are not limited to, Aerosol A-22 (manufactured by Cytec Industries Inc., located in West Paterson, N.J.), Iconol OP40 and Pluronic 62 (both manufactured by BASF Corporation, Mount Olive, N.J.), Ammonyx SO (manufactured by Stepan Company, Northfield, Ill.) and mixtures thereof.

Optional ingredients: The release coating compositions of the present invention can further include polymers that are known and conventionally used in release coatings. The release coating composition can further include from 0% to about 95%, preferably from 0% to about 50% by weight of a conventional release coating homopolymer and/or copolymer prepared from monomers selected from the group consisting of alkylacrylates and alkylmethacrylates, vinylacetates, vinylchlorides, acrylonitriles, siloxanes, organo-siloxanes, and combinations thereof. Typically, the BSA polymers of the present invention would be mixed with such conventional release coating polymers to form a blend of the polymers.

B. Articles of Manufacture Having Release Coatings

In another embodiment, the present invention is directed to an article of manufacture including a backing having an adhesive-coated backing side and a release-coated backing side, as described above. In this embodiment, the backing is wound onto itself so that the adhesive-coated backing side is placed in physical contact with the release-coated backing side. The dry release coating includes from about 80% to about 100% by weight of the BSA polymer. The dry release coating can further include up to about 20% by weight of a release promoting additive.

In an alternative embodiment, one or both sides of the backing can be coated with adhesive (double adhesive-coated backing), and a release-coated paper having a release coating, as described above, on a separate backing is placed in physical contact with one or both sides of the adhesive-coated backing sides.

Pressure sensitive adhesives that are useful according to the present invention are conventional materials typically used and known in the art. Examples of pressure sensitive adhesives include, but are not limited to, natural rubber adhesives; butyl rubber adhesives; vinyl ether adhesives; acrylic adhesives; solvent-based rubber adhesives including cis-1,4-polyisoprene; block copolymer adhesives including styrene-butadiene-styrene block and styrene-isoprene-styrene block copolymers; hot-melt block copolymer adhesives; synthetic rubbers including styrene-butadiene rubber; silicone based pressure sensitive adhesives; and the like.

Backings that are useful according to the present invention are any suitable substrates known in the art. Examples of useful backings include, but are not limited to, films, foil, paper, nonwovens, wovens and composites thereof.

The release coating and the adhesive coating can be applied to the backing using conventional methods known in the art, such as knife coating, roller coating and print coating. After the coatings are applied to the backing, they may be dried by any heating method that is well known in the art. Typically, the dry thickness of the release coatings are from about 0.1 to about 0.5 mils according to the selection of backing, pressure-sensitive adhesive, and coating technique. Dry release coating thicknesses from about 0.2 to about 0.35 mils are preferred. For the BSA polymers of the present invention, 0.39 mils is equal to about 10 g/m$^2$.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Example 1

Preparation of Polymer Composition and Peel Force Test Performed on Release Coating A Obtained Therefrom A. Preparation of the Polymer Composition The following preparation method utilized a conventional emulsion polymerization process. A 1-gallon reactor was initially charged with 114.9 grams of de-ionized water, 50.37 grams of seed latex, 1.19 grams of DISSOLVINE E-39 (chelating agent) and 9.51 grams of itaconic acid. The reactor was heated to 90° C. and an initial dosage of 114.0 grams of 5% by weight water solution of ammonium persulfate was added to the reactor. Then four feeds were added to the reactor: an aqueous feed over 3.5 hours, a monomer feed over 3.5 hours, a butadiene feed over 3.5 hours, and a catalyst feed over 4.75 hours. The aqueous feed included 178.5 grams of water, 55.6 grams of CALFOAM ES-303 (28% active by weight), 29.8 grams of acrylamide (50% active by weight), and 51.8 grams of acrylic acid (100% active by weight). The liquid monomer feed included 23.7 grams of t-dodecyl mercaptan, 404.7 grams of acrylonitrile, and 1204 grams of styrene. The butadiene feed included 285.3 grams of butadiene. The catalyst feed included 266.6 grams of 5% (w/w) ammonium persulfate.

After the fourth hour, the temperature was raised to 95° C. and 100 grams of 10% (w/w) sodium hydroxide was added to the reactor to raise the pH of the reactor latex. 56 ml of 5% (w/w) t-butyl hydroperoxide and 56 ml of 5% (w/w) sodium bisulfate were then added over 2 hours in order to strip the latex of remaining monomers.

After cooling the reactor down to 30° C., it was determined that less than 100 ppm of acrylonitrile was in the latex by gas chromatographic method. The latex had a pH of about 7 and a total solids concentration of 49.1% by weight, indicating substantially complete conversion of all monomers into BSA polymer. The polymeric composition of this latex sample calculated on mass balance basis was 56% by weight of styrene, 20.5% by weight of acrylonitrile, 20.0% by weight of butadiene, 0.5% by weight of itaconic acid, 2.33% by weight of acrylic acid, and 0.67% by weight of acrylamide. Minor amounts of additional monomers that are conventionally used in emulsion polymerization, such as n-methylolacrylamide, fumaric acid and the like, can be also be used in various combinations or separately.

B. Preparation of Release Coating A and Peel Force Testing

A crepe, polymer saturated paper (manufactured by Tesa Tape Inc., located in Charlotte, N.C. of 26 lb./ream thickness, and saturated with Butofan NS 209 polymer manufactured by BASF Corporation located in Mount Olive, N.J.), such as is typically used for the manufacture of pressure-sensitive masking tapes, was coated by hand using a wire-wound drawn-down rod with 25% by weight total solids latex composition of Example 1. The latex composition was obtained by diluting 100 grams of the latex composition produced in Example 1 (49.1% solids) with 96.4 grams of water to give 196.4 of a latex composition having 25% by weight total solids. The wet coating was dried at 150° C. for 90 seconds resulting in a dry coating having a thickness of about 0.00018 inch, which is the typical thickness of release coatings used in the masking tape industry. The thickness was determined by weighing 3"×3" square paper before and after coating, and using the relation of 0.39 mils for about 10 g/m$^2$. Strips of commercial masking tape (2" General Purpose 10404 masking tape manufactured by TESA TAPE Inc., located in Charlotte, N.C.) were then adhered to the crepe paper now coated with the release coating. It is believed that 2" General Purpose 10404 masking tape had a solvent based tackified natural rubber adhesive. One set of these bonded strips were heat aged in an oven for 72 hours at 150° F., and another set of these bonded strips were also heat aged under the same conditions but with the additional maintenance of 80% humidity. The peel force was then determined on five samples for each test set using a conventional INSTRON tester (INSTRON model 1125, manufactured by Instron Corporation, located in Canton, Mass.) with the peel rate set at 12 inches/min. at room temperature in accordance with Pressure Sensitive Tape Council (PSTC) standards. The results are provided below in Table 1.

Example 2

Preparation of Polymer Composition and Peel Force Test Performed on Release Coating B Obtained Therefrom The BSA polymer composition was prepared as described in Example 1. However, about 2% by weight of AEROSOL A-22, a release promoting additive, was added to the composition before it was coated onto the crepe, polymer saturated paper as described in Example 1. Two sets of bonded strips were similarly prepared and heat aged for 72 hours at 150° F. The peel force results are provided below in Table 1.

Comparative Examples 3–6

Comparative Examples 3–6 were also conducted utilizing the same crepe, polymer-saturated paper, commercial masking tape and testing conditions as described in Examples 1 and 2. In Comparative Example 3, no release coating was used. In Comparative Example 4, a conventional carboxylated styrene-butadiene rubber polymer (XSBR) having a desired high glass transition temperature of about 42 ° C. was used to prepare the release coating. The XSBR, having the trade name Styrofan ND 834, was obtained from BASF Corporation, located in Mount Olive, N.J. In Comparative Examples 5 and 6, release coatings having the same thickness as Example 1 were prepared from commercially available acrylic-based release coating compositions R&H R-253 (believed to contain a polymer of ethyl-acrylate and acrylonitrile with a post-added release promoting additive) and R&H WH-130 (believed to contain a polymer of ethyl-acrylate and acrylonitrile), respectively, obtained from Rohm and Haas Company. These examples are provided for comparisons for release coating performance.

TABLE 1

Summary of Test Results

| Examples | Release Coating Used | Peel Force (oz/2 inches) aged by heat only | aged by heat and humidity |
|---|---|---|---|
| Invention Example 1 | Release Coating A | 23 | 21 |
| Invention Example 2 | Release Coating B | 21 | 19 |
| Comparative Example 3 | No coating | 86 | 77 |
| Comparative Example 4 | Convention XSBR | 58 | 71 |
| Comparative Example 5 | Commercial Coating A | 14 | 17 |
| Comparative Example 6 | Commercial Coating B | 23 | fail[1] |

[1]too low peel force, which is undesirable.

Table 1 shows that Invention Example 1 (BSA polymer without post-added release additive) and Invention Example 2 (BSA polymer with 2% by weight of AEROSOL A-22) provided release characteristics with a peel force between 15–25 oz/2 inches, which is within the definition of "tight release," as described in "Handbook of Pressure-Sensitive Adhesive Technology," ed. D. Satas, Satas & Associates, Warwick, R.I., 1999, Chap. 26, Table 1, pg. 635. More importantly, the peel force values for the aged by heat and humidity test samples were lower than the peel force values of the aged by heat only test samples.

In contrast, Comparative Example 3 (no release coating) provided the usual adhesive peel force characteristics of masking tape pressure-sensitive adhesive that is adhered to various other surfaces that do not have a release coating surface. Similarly, Comparative Example 4 (release coating containing commercially available conventional XSBR polymer) resulted in very high release peel force.

The release coatings of Comparative Example 5 (commercially available coating) provided low peel force. However, the peel force value of the aged by heat and humidity sample was higher than the peel force value of the aged by heat sample. In addition, the release coatings of Comparative Example 6 (another commercially available acrylic-based release coating) failed in the humidity test with too low a release force.

Other embodiments and uses of the invention will be apparent to those skilled in the art from consideration of the specification and practice of the invention disclosed herein. All documents referenced herein are specifically and entirely incorporated by reference. The specification and examples should be considered exemplary only, with the true scope and spirit of the invention being indicated by the following claims. As will be easily understood by those of ordinary skill in the art, variations and modifications of each of the disclosed embodiments can be easily made within the scope of this invention as defined by the following claims.

We claim:

1. An article of manufacture, comprising:
   (a) a backing comprising an adhesive-coated backing side; and
   (b) a release coating applied to the other side of the backing of (a) or a separate backing, wherein the release coating comprises a copolymer having a $T_g$ from 0° C. to about 75° C., wherein the copolymer comprises a reaction product of from greater than 0% to about 50% by weight of acrylonitrile monomer, and from about 50% to less than 100% by weight of butadiene and styrene monomers;
   wherein the release coating is in contact with the adhesive-coated backing side.

2. The article according to claim 1, wherein the copolymer reaction product comprises from about 15% to about 40% by weight of acrylonitrile monomer and from about 60% to about 85% by weight of butadiene and styrene monomers.

3. The article according to claim 1, wherein the copolymer reaction product further comprises from about 0.5% to about 15% by weight of at least one stability enhancing monomer selected from the group consisting of methacrylic acid, acrylic acid, itaconic acid, acrylamide, N-methylolacrylamide, and combinations thereof.

4. The article according to claim 3, wherein the copolymer reaction product comprises from about 0.5% to about 3.0% by weight of acrylic acid monomer, from 0% to about 1.5% by weight of itaconic acid monomer, and from 0.5% to about 3.0% by weight of acrylamide monomer.

5. The article according to claim 1, wherein the release coating further comprises less than or equal to about 20% by weight of a release promoting additive.

6. The article according to claim 5, wherein the release promoting additive is selected from the group consisting of anionic surface active agents, cationic surface active agents, zwitter-ionic surface active agents, non-ionic surface active agents, and mixtures thereof.

7. The article according to claim 6, wherein the release promoting additive is selected from the group consisting of N-alkyl sulfosuccinamates, dialkyl sulfosuccinates, alkyl sulfates and sulfonates, alkyl-polyalkyleneoxidesulfates, alkyl-aryl-polyalkyleneoxidesulfates, alkyl-aryl sulfonates, alkylpolyalkyleneoxides, alkyl-aryl-polyalkyleneoxides, block copolymers of alkyloxides, and mixtures thereof.

8. The article according claim 1, wherein the release coating further comprises a polymer comprising a reaction product of one or more monomers selected from the group consisting of alkylacrylates and alkylmethacrylates, vinylacetates, vinylchlorides, acrylonitriles, siloxanes, organo-siloxanes, and combinations thereof.

9. The article of claim 1, wherein the copolymer has a $T_g$ from about 20° C. to about 60° C.

10. The article of claim 1, wherein the release coating further comprises from about 1.0% to about 15% by weight of a release promoting additive.

* * * * *